United States Patent
Kasashima et al.

[11] Patent Number: 6,123,534
[45] Date of Patent: Sep. 26, 2000

[54] GOLF BALL MOLD

[75] Inventors: Atsuki Kasashima; Keisuke Ihara; Hirotaka Shimosaka, all of Chichibu, Japan

[73] Assignee: Bridgestone Sports Co., Ltd., Tokyo, Japan

[21] Appl. No.: 09/185,594

[22] Filed: Nov. 4, 1998

[30] Foreign Application Priority Data

Nov. 5, 1997 [JP] Japan ................................ 9-319038

[51] Int. Cl.[7] ........................................ B29C 45/14
[52] U.S. Cl. ................ 425/116; 264/279.1; 425/120; 425/573
[58] Field of Search ....................... 425/116, 117, 425/120, 125, 127, 129.1, 573; 264/275, 279.1

[56] References Cited

U.S. PATENT DOCUMENTS

| | | | |
|---|---|---|---|
| 5,458,473 | 10/1995 | Banji | 425/116 |
| 5,688,193 | 11/1997 | Kasasima et al. | 425/116 |
| 5,874,038 | 2/1999 | Kasashima et al. | 425/116 |
| 5,975,869 | 11/1999 | Shimosaka et al. | 425/116 |

FOREIGN PATENT DOCUMENTS

| | | | |
|---|---|---|---|
| 61-173907 | 8/1986 | Japan | 425/116 |
| 5-36210 | 2/1993 | Japan . | |
| 6-143349 | 5/1994 | Japan . | |

*Primary Examiner*—Robert Davis
*Attorney, Agent, or Firm*—Sughrue, Mion, Zinn, Macpeak & Seas, PLLC

[57] ABSTRACT

A golf ball mold includes a pair of mold sections which are removably mated along a parting surface to define a spherical cavity by their concave surfaces. The concave surfaces are provided with a plurality of dimple-forming projections. Some dimple-forming projections are integrally formed in one mold section at the parting surface as raised knobs that protrude in a transverse direction over a distance of ½ to ¼ of the projection diameter, and the other mold section is provided at the parting surface with recesses for receiving the raised knobs. Using the mold, seamless golf balls with improved flight performance can be molded.

19 Claims, 4 Drawing Sheets

GOLF BALL MOLD

BACKGROUND OF THE INVENTION

1. Field of the Invention

This invention relates to a golf ball mold defining a spherical cavity free of a great circle which does not intersect with dimple-forming projections. It also relates to golf balls of the seamless type prepared using the mold.

2. Related Art

As is well known in the art, golf balls are generally molded using a mold comprising a pair of mold sections. The mold sections are removably mated to define a spherical cavity by their concave surfaces which are provided with a plurality of dimple-forming projections for indenting dimples in the surface of a golf ball being molded in the mold. A parting plane between the mold sections is located substantially at the equator of the cavity.

No dimple-forming projections are provided at the edge of the mold sections corresponding to the parting plane so that an endless land strip may be formed on the golf ball being molded. This is for convenience of manufacture because during molding, cover stock oozes out between the parting surfaces of the mold and cures thereat to form fins, and after removal from the mold, the molded ball must be polished for abrading off the fins.

However, the provision of an endless land strip along the parting plane interrupts the continuous arrangement of dimples, imposing a constraint on the dimple arrangement. The resulting non-uniform dimple arrangement is undesirable for the aerodynamic performance of the ball.

To overcome such inconvenience, a variety of molds for molding golf balls of the so-called seamless type have been proposed wherein dimple-forming projections are disposed across the parting surface. FIGS. 6, 7 and 8 illustrate such exemplary molds. These molds allow an increased freedom of arrangement of dimple-forming projections so that the dimple-forming projections may be distributed on the cavity surface in a more uniform and dense fashion.

More particularly, FIG. 6 is a plan view of the lower mold section near the parting surface as seen from the equator side of the cavity. FIG. 7 is an enlarged side view of the mold near the parting surface as viewed from the inside of the cavity. In this mold, dimple-forming projections 23 are disposed in the cavity surface so as to extend across the parting plane PL. One mold section (lower mold section 20b in FIG. 7) at the parting surface is provided with concave furrows 24 which are semi-circular in cross section and extend radially with respect to the cavity 22. In the furrows 24, shaping pins 25 each having a dimple-forming projection at a distal end are received. The pins 25 are secured to the parting surface by screws 26. The other mold section (upper mold section 20a in FIG. 7) at the parting surface is correspondingly provided with concave furrows 27 for receiving the shaping pins 25 fixedly secured to the lower mold section. It is noted that gates for injecting molding material therethrough are depicted at 28 in FIG. 6.

When a golf ball is molded in the mold shown in FIGS. 6 and 7, fins of the cover stock penetrating out along the parting plane of the mold are located along the periphery of dimples and on the same level as the land where access for abrasion is easy. That is, formation of fins within dimples or depressions where access for abrasion is difficult is avoided.

FIG. 8 is an enlarged side view of the lower mold section near the parting surface as viewed from the inside of the cavity. The parting surface of the mold section is corrugated to form corrugations 29. Dimple-forming projections 25 are disposed within each corrugation 29 and on a circumferential extension of the parting surface PL (or on the equator). Where the lower mold section is provided with corrugations 29, the upper mold section is provided with recesses for receiving the corrugations, though not shown. When a golf ball is molded in the mold shown in FIG. 8, fins of the squeezed-out cover stock are located along the periphery of the corrugations, avoiding formation of fins within dimples.

However, the mold of the type wherein shaping pins each having a projection at a distal end are secured by screws as shown in FIGS. 6 and 7 has the problem that on repeated use for a long period of time, the screws can be loosened to create gaps between the pins and the furrows. Once loosened, the pins can be shifted or disengaged, leaving a possibility that the disengaged pins are bit between the mold sections to damage or break the mold sections.

In the case of the mold of the type wherein the parting surface is corrugated as shown in FIG. 8, one mold section is manufactured by shaping with a hemispherical male model or master corresponding to the hemispherical shape of the desired golf ball. The range of angle of the master extending from the pole (north or south pole) of the cavity to the parting surface is increased by the amount of the corrugation and exceeds 90°. The extended area of the master engages the mold section, prohibiting the mold section from being removed from the master.

SUMMARY OF THE INVENTION

Therefore, an object of the present invention is to provide a mold for seamless golf balls comprising a pair of mold sections wherein each mold section can be manufactured using a conventional hemispherical male model without the problem of difficult removal from the model, the mold is improved in durability and stability, and a high population of dimple-forming projections are uniformly distributed on the spherical cavity surface.

According to the invention, there is provided a golf ball mold comprising a pair of mold sections which are removably mated along a parting surface to define a spherical cavity by their concave surfaces, the concave surfaces being provided with a plurality of dimple-forming projections having a width, the parting surface being substantially coplanar with the equator of the spherical cavity. Some dimple-forming projections are integrally formed in one mold section at the parting surface as raised knobs that protrude beyond the parting surface in a transverse direction over a distance of not more than one half of the projection width. The other mold section is provided at the parting surface with recesses for receiving the raised knobs. It is preferred that when great circles are traced on the cavity, every great circle has at least one dimple-forming projection disposed thereon. Golf balls molded using the mold are also contemplated herein.

Since one of the mold sections is integrally provided at its parting surface with dimple-forming projections as raised knobs according to the present invention, each mold section can be manufactured without the difficulty of removal from a model, and the mold is highly durable and stable. The mold is suited for molding seamless golf balls.

More particularly, since the dimple-forming projections are formed as raised knobs integral with one mold section at its parting surface, the inventive mold is fully durable and stable during the repeated service over a long period of time, without the risk of damaging or breaking the mold as opposed to the prior art mold wherein shaping pins secured by screws can be loosened or disengaged. Since the raised knobs protrude from the parting surface only a limited distance of not more than ½ of the projection width, each mold section can be manufactured using a conventional hemispherical male model without the problem of difficult removal from the model. The golf ball mold defining a spherical cavity free of a great circle which does not intersect with dimple-forming projections is suited in molding seamless golf balls.

The golf balls molded using the inventive mold have improved flight performance since the increased freedom of dimple arrangement allows dimples to be distributed on the ball surface uniformly and at a high population.

DETAILED DESCRIPTION OF THE INVENTION

Figure 1:
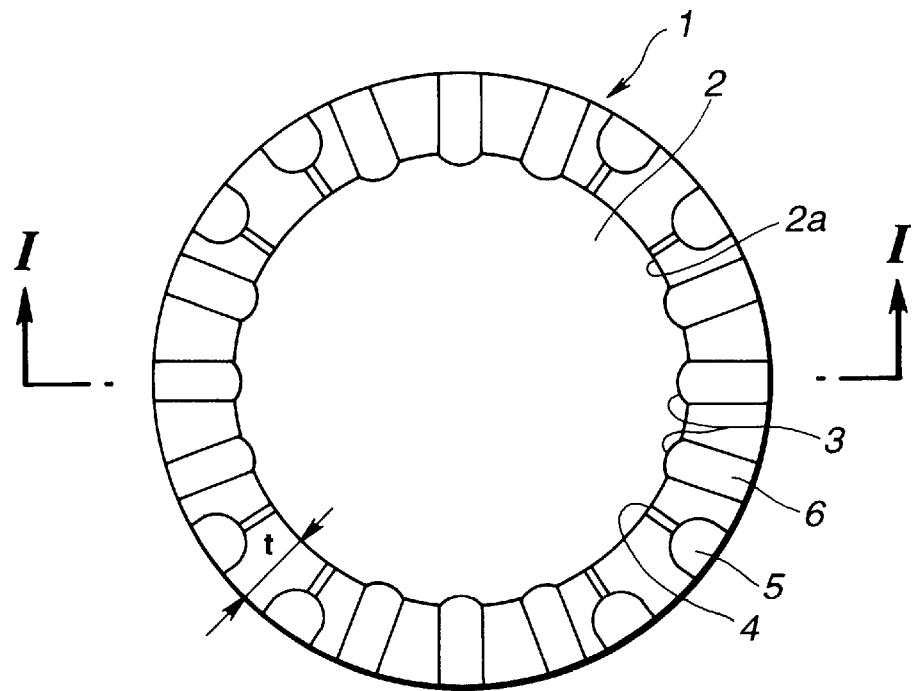
FIG. 1 is a horizontal plan view of a lower section of a golf ball mold according to one embodiment of the invention.
Figure 2:
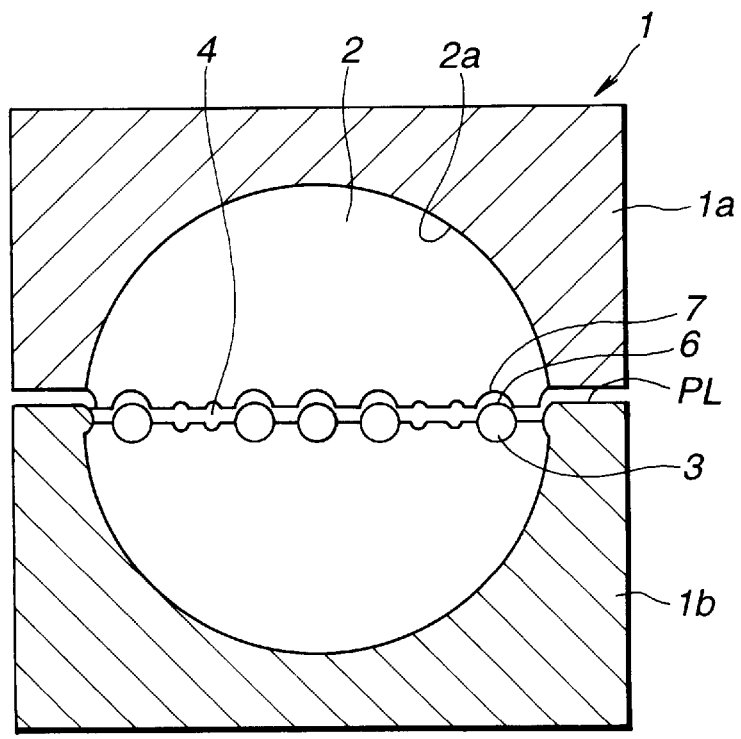
FIG. 2 is a cross section taken along lines I—I in FIG. 1.

Referring to FIGS. 1 and 2, there is illustrated a mold for the manufacture of golf balls by injection molding according to one embodiment of the invention. FIG. 1 is a plan view of a lower section of the golf ball mold as viewed from the parting plane or equator side thereof. FIG. 2 is a cross section taken along lines I—I in FIG. 1, showing the lower mold section and the upper mold section (not shown in FIG. 1) spaced apart from each other.

As shown in FIGS. 1 and 2, the golf ball mold 1 of the invention includes a pair of mold sections 1a and 1b which are removably mated along a parting plane PL to define a spherical cavity 2 by their concave surfaces 2a. The concave surfaces 2a are provided with a plurality of dimple-forming projections 3 over the entire areas. The parting surface PL is substantially coplanar with the equator of the spherical cavity 2. The parting surface PL is not exactly planar, but is provided with recessed or raised portions at positions where dimple-forming projections are located. It is noted that in FIG. 2, the majority of dimple-forming projections on the cavity surface are omitted for convenience of drawing.

The mold is further provided with a plurality of circumferentially spaced apart nozzles 5 and a corresponding plurality of gates 4 in communication with the nozzles 5, for injecting a molding material into the cavity 2 therethrough. The gates 4 are open at the parting surface to the cavity 2. The gates 4 are arranged on the parting surface so as not to overlap the dimple-forming projections. The number of gates 4 is preferably four to twelve. In the illustrated embodiment, eight gates 4 are arranged at predetermined intervals.

According to the invention, some dimple-forming projections are integrally formed in the lower mold section 1b at the parting surface PL as raised knobs 6. Although the lower mold section 1b is provided with the raised knobs 6 in the illustrated embodiment, the one mold section to be provided with the raised knobs may be either the upper section or the lower section or both if desired. The raised knobs 6 protrude beyond the parting surface PL in a transverse direction over a distance of not more than one half, preferably ½ to ¼ of the width of the dimple-forming projection. Since the lower mold section is provided with the raised knobs 6 in the illustrated embodiment, they protrude toward the upper mold section. The raised knobs 6 present dimple-forming projections 3 when viewed in a radial direction with respect to the center of the spherical cavity. The upper mold section 1a is provided at the parting surface with recesses 7 for receiving the raised knobs 6. If the raised knobs 6 protrude beyond the parting surface PL over a distance of more than one half of the width of the dimple-forming projection, the removal of the mold section from the master becomes difficult.

The plurality of, preferably four to sixteen, raised knobs 6 or dimple-forming projections are formed integrally with the one mold section at the parting surface. In the illustrated embodiment, twelve raised knobs 6 or dimple-forming projections 3 are formed integrally with the lower mold section 1b at the parting surface PL. The dimple-forming projections provided by the raised knobs 6 at the parting surface are the same as the remaining dimple-forming projections on the cavity surface. Where plural types of projections are formed on the cavity surface, the dimple-forming projections provided by the raised knobs 6 at the parting surface are the same as at least one type of projections. The shape delimited by the edge of the projection which is the same as the planar shape of a dimple is preferably circular. In this case, the width of the projection is given by the diameter of the circular projection, which is usually about 2 mm to about 5 mm.

The raised knob presenting a dimple-forming projection at a radially inner end has a semi-circular shape in cross section at the parting surface, is raised from and integral with the parting surface, and radially extends through the thickness t of the mold (which is the width of the parting surface) to form a semi-circular cylinder. The thickness t of the mold is typically about 3 mm to about 20 mm. The radial distance of the raised knob presenting a dimple-forming projection need not extend throughout the mold thickness and may be shorter than t, for example, within t/2. The radial distance of the recess in the upper mold section may correspond to the radial distance of the raised knob.

The positional relationship of the raised knobs presenting dimple-forming projections to the parting surface is described in further detail.

Figure 3:
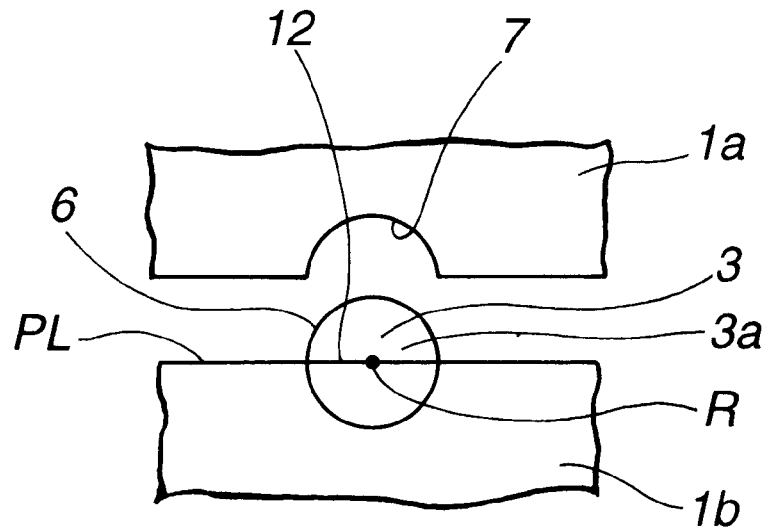
FIG. 3 is an enlarged side view of a mold according to one embodiment of the invention near the parting surface.

FIG. 3 is an enlarged side view of one raised knob 6 presenting the dimple-forming projection 3 shown in FIGS. 1 and 2 as viewed from the inside of the cavity. The raised knob 6 or dimple-forming projection 3 has a distal surface (radially inner surface) 3a which forms a projection of circular cross section on the cavity surface. The top of this projection depicted by the center R of the cross sectional circle is substantially aligned with an extension 12 of the parting surface PL. That is, the projection 3 is formed integral with the lower mold section 1b so that the projection 3 protrudes from the parting surface PL just by one half of its diameter. The upper mold section 1a is correspondingly formed with the recess 7 for close fit with the raised knob 6 or projection 3.

Figure 4:
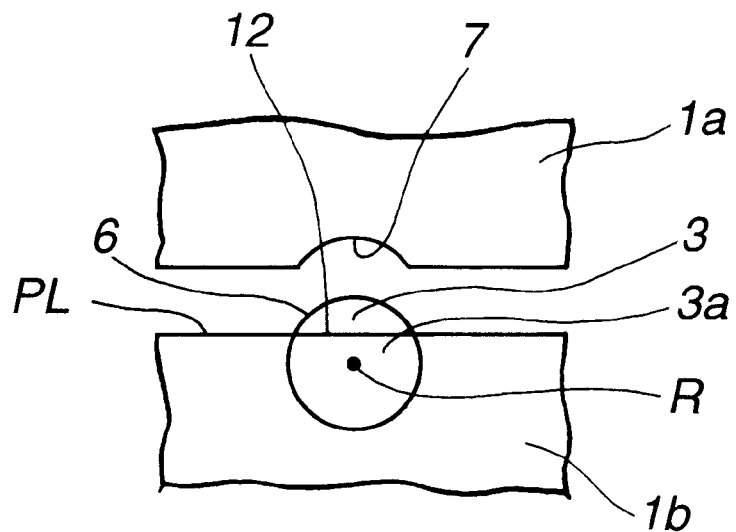
FIG. 4 is an enlarged side view of a mold according to another embodiment of the invention near the parting surface.

Another embodiment is shown in FIG. 4 wherein the raised knob 6 or dimple-forming projection 3 is formed such that the top of this projection depicted by the center R of the cross sectional circle is positioned below the extension 12 of the parting surface PL. Differently stated, the raised knob 6 or dimple-forming projection 3 is formed integral with the lower mold section 1b such that the height of the knob protruding beyond the parting surface PL is equal to ¼ of the diameter of the circular projection. The recess 7 formed in the upper mold section is correspondingly shallow.

Although the raised knobs 6 or dimple-forming projections 3 are formed in the lower mold section 1b in the embodiments shown in FIGS. 3 and 4, the knobs or projections may be formed in the upper mold section. When the knobs or projections are arranged near the parting surface or the equator of the cavity, they may be arranged as a mixture of the type shown in FIG. 3 (with center R aligned with extension 12) and the type shown in FIG. 4 (with center R shifted downward from extension 12).

Though not shown, the knobs or projections of the type shown in FIG. 3 or 4 may be arranged in both the lower and upper mold sections. For example, the lower mold section is provided with the knobs or projections in first selected areas along the circumference of the parting surface, and the upper mold section provided with the knobs or projections in second selected areas.

Figure 5:
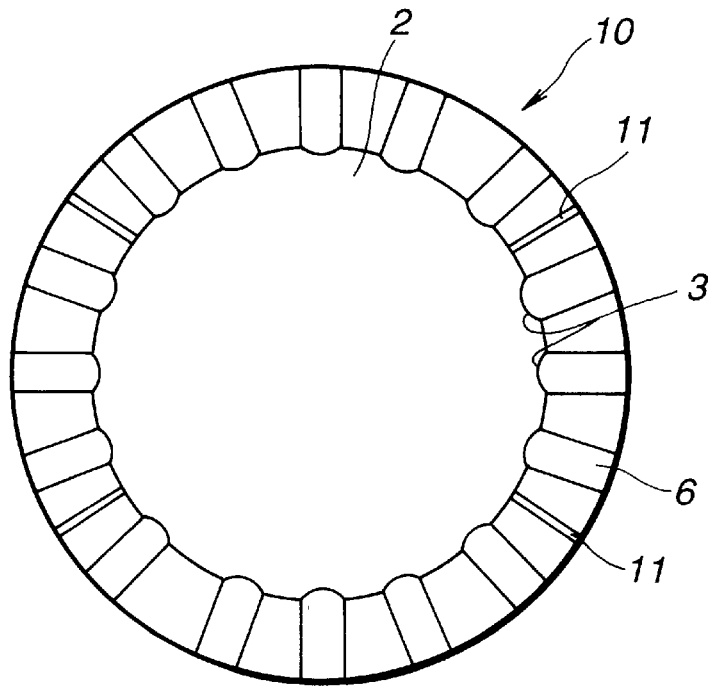
FIG. 5 is a horizontal plan view of a lower section of a golf ball mold according to another embodiment of the invention.

FIG. 5 is a plan view of the lower mold section of a golf ball mold 10 of the compression molding type according to a further embodiment of the invention, as viewed from the parting surface side. In the mold 10, sixteen raised knobs 6 or dimple-forming projections 3 are disposed in the parting surface. If desired, the mold is provided with four spews 11 extending through the parting surface for allowing an excess of molding material to discharge. The remaining elements are the same as in the mold of FIGS. 1 and 2.

Figure 6:
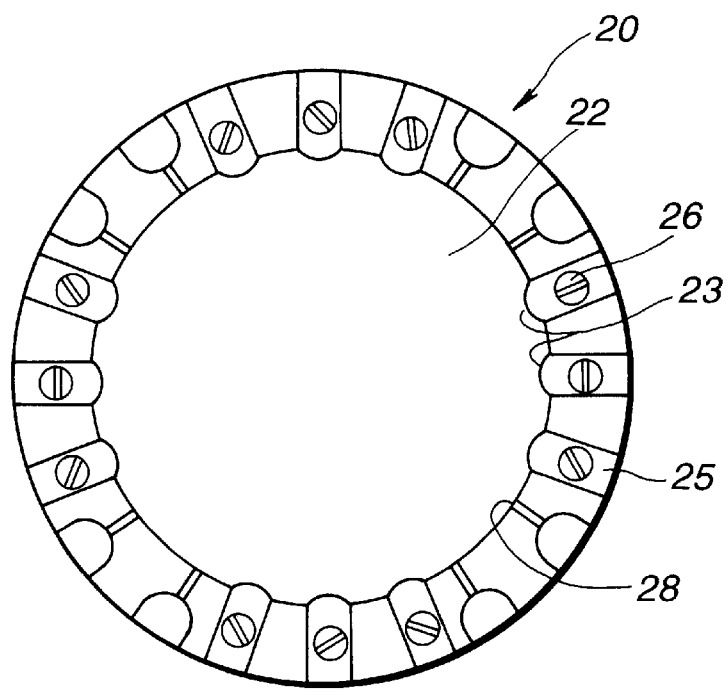
FIG. 6 is a horizontal plan view of a prior art mold (lower mold section).
Figure 7:
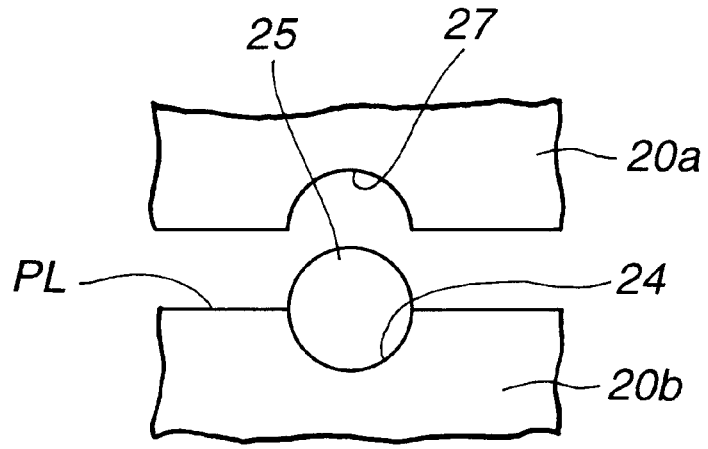
FIG. 7 is an enlarged side view of the mold of FIG. 6 near the parting surface.

Typically, the golf ball mold of the invention is adapted to mold seamless golf balls in the sense that when great circles are traced on the cavity, every great circle has at least one, preferably 4 to 30 dimple-forming projections disposed thereon. This allows dimple-forming projections to be distributed on the cavity surface in a uniform and dense fashion. Since those dimple-forming projections disposed at the parting surface are formed as raised knobs integral with one mold section, the inventive mold is fully durable and stable for the repeated use over a long period of time, without the risk of damaging or breaking the mold as opposed to the prior art mold of FIGS. 6 and 7 wherein shaping pins are secured by screws with the risk that the pins can be loosened or disengaged.

Figure 8:
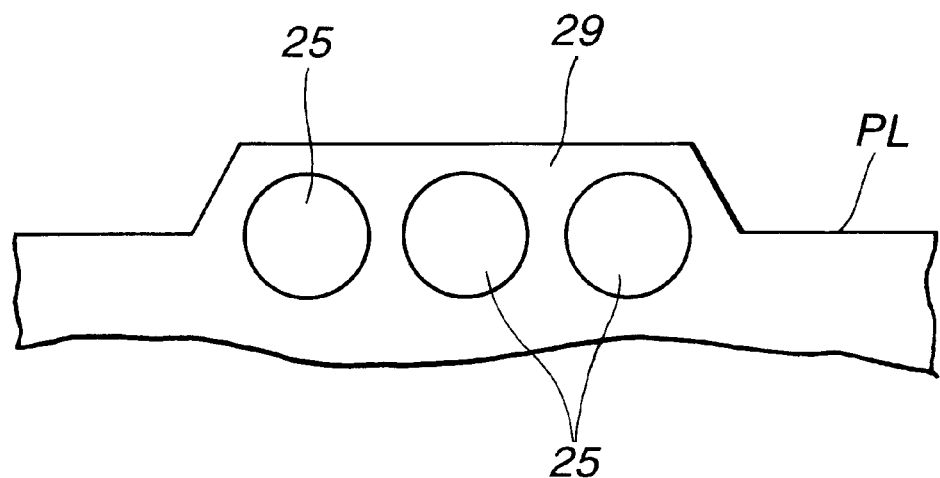
FIG. 8 is an enlarged side view of another prior art mold (lower mold section) near the parting surface.

The mold of the invention can be prepared using a conventional hemispherical male model or master. Since the dimple-forming projections formed as raised knobs integral with one mold section at its parting surface protrude only a limited distance from the parting surface, the mold of the invention eliminates the problem of the prior art mold of the corrugation type shown in FIG. 8 that the corrugations engage with the master to prevent the mold section from being removed from the master.

In molding golf balls using the mold of the invention, the method is not critical and any of conventional molding methods may be used. When a cover is formed around a core using the mold of the injection molding type shown in FIGS. 1 and 2, the upper and lower mold sections 1a and 1b are removably mated, with the core placed in the cavity by suitable support pins (not shown). A cover stock is fed from an injection molding machine (not shown) to the gates 4 (which are open at the parting surface PL) through a main runner, an annular runner, and nozzles 5, and injected into the space between the core and the cavity surface 2a. Immediately before or concurrently with the completion of injection, the support pins are withdrawn to the cavity surface. A cover is formed around the core in this way.

In the case of the mold of heat compression molding type shown in FIG. 5, a core is enclosed with a pair of preformed half cups of cover stock. This is compression molded in the mold at a predetermined pressure and temperature. The cover stock used herein may be thermoplastic resins or the like commonly used as the golf ball cover.

The thus molded golf ball according to the invention is a so-called seamless golf ball having dimples at the position of the equator or parting surface as well. On account of the increased freedom of dimple arrangement, dimples can be distributed on the ball surface uniformly and at a high population, leading to improved flight performance.

While the golf ball mold of the invention is best suited for forming a cover around a core, the use of the mold is not limited thereto. The mold can be used in the preparation of one-piece golf balls as well as two-piece golf balls, multi-piece golf balls having at least three layers, and wound golf balls.

There has been described a golf ball mold comprising a pair of mold sections wherein some dimple-forming projections are integrally formed in one mold section at the parting surface as raised knobs, with the advantages that the mold inhibits the dimple-forming projections at the parting surface from being shifted or disengaged, each mold section can be manufactured using a conventional hemispherical male model without the problem of difficult removal from the model, and dimple-forming projections are uniformly and densely distributed on the spherical cavity surface. Using the mold, seamless golf balls with improved flight performance can be molded.

Japanese Patent Application No. 319038/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball mold comprising a pair of mold sections which are removably mated along a parting surface to define a spherical cavity by their concave surfaces, the concave surfaces being provided with a plurality of dimple-forming projections having a width, the parting surface being substantially coplanar with the equator of the spherical cavity, characterized in that some dimple-forming projections are integrally formed in one mold section at the parting surface as raised knobs that protrude beyond the parting surface in a transverse direction over a distance of not more than one half of the projection width, and the other mold section is provided at the parting surface with recesses for receiving the raised knobs.

2. The mold of claim 1 wherein when great circles are traced on the cavity, every great circle has at least one dimple-forming projection disposed thereon.

3. The mold of claim 1 wherein said raised knobs protrude a distance of ½ to ¼ of the projection width.

4. The mold of claim 1 wherein the dimple-forming projections are circular in cross section and the width of the projection is the diameter of the projection.

5. The mold of claim 1 wherein 4 to 16 dimple-forming projections are integrally formed in one mold section at the parting surface as raised knobs.

6. The mold of claim 1, wherein said raised knobs protrude beyond the parting surface by a distance of less than ½ of the projection width.

7. The mold of claim 1, wherein the dimple-forming projections as the raised knobs are formed in each of the pair of mold sections.

8. The mold of claim 1, wherein the dimple-forming projections as the raised knobs are arranged as a mixture of different distance of the raised knobs that protrude beyond the parting surface.

9. The mold of claim 1, wherein said mold further comprises a plurality of nozzles spaced apart from one another and a corresponding plurality of gates in communication with the nozzles, for injecting a molding material into the cavity of the molds.

10. The mold of claim 4, wherein the width of the projection is about 2 to 5 mm.

11. A golf ball mold comprising a pair of mold sections which are removably mated along a parting surface to define a spherical cavity by their concave surfaces, the concave surfaces being provided with a plurality of dimple-forming projections having a width, the parting surface being substantially coplanar with the equator of the spherical cavity, the cavity having traceable great circles, each of which includes 4–30 dimple-forming projections disposed thereon, characterized in that:

some dimple-forming projections are integrally formed in one mold section at the parting surface coplanar with the equator as one of the great circles on the spherical cavity as raised knobs that protrude beyond the parting surface in a transverse direction over a distance of no more than one-half of the projection width, and the other mold section is provided at the parting surface with recesses for receiving the raised knobs.

12. The mold of claim 11, wherein the dimple-forming projections as the raised knobs are arranged as a mixture of different distance of the raised knobs that protrude beyond the parting surface.

13. The mold of claim 11, wherein said raised knobs protrude a distance of ¼ of the projection width.

14. The mold of claim 11, wherein said raised knobs protrude beyond the parting surface by a distance of less than ½ of the projection width.

15. The mold of claim 11, wherein the dimple-forming projections are circular in cross section and the width of the projection is the diameter of the projection.

16. The mold of claim 15, wherein the width of the projection is about 2 to 5 mm.

17. The mold of claim 11, wherein 4 to 16 dimple-forming projections are integrally formed in one mold section at the parting surface as raised knobs.

18. The mold of claim 11, wherein the dimple-forming projections as the raised knobs are formed in each of the pair of mold sections.

19. The mold of claim 11, wherein said mold further comprises a plurality of nozzles spaced apart from one another and a corresponding plurality of gates in communication with the nozzles, for injecting a molding material into the cavity of the molds.

* * * * *